United States Patent [19]

Ligtenberg

[11] Patent Number: 5,333,212
[45] Date of Patent: Jul. 26, 1994

[54] IMAGE COMPRESSION TECHNIQUE WITH REGIONALLY SELECTIVE COMPRESSION RATIO

[75] Inventor: Adrianus Ligtenberg, Palo Alto, Calif.

[73] Assignee: Storm Technology, Mountain View, Calif.

[21] Appl. No.: 978,312

[22] Filed: Nov. 17, 1992

Related U.S. Application Data

[63] Continuation of Ser. No. 664,256, Mar. 4, 1991, abandoned.

[51] Int. Cl.$^5$ .................. G06K 9/36; G06K 9/46; H04N 7/12
[52] U.S. Cl. ..................... 382/56; 348/390; 348/418
[58] Field of Search .................. 358/133, 135, 433; 382/56; G06K 9/36, 9/46; H04N 1/04, 1/40

[56] References Cited

U.S. PATENT DOCUMENTS

| | | | |
|---|---|---|---|
| 4,286,256 | 8/1981 | Langdon, Jr. et al. | 340/347 |
| 4,295,125 | 10/1981 | Langdon, Jr. | 340/347 |
| 4,463,342 | 7/1984 | Langdon, Jr. et al. | 340/347 |
| 4,467,317 | 8/1984 | Langdon, Jr. et al. | 340/347 |
| 4,633,490 | 12/1986 | Goertzel et al. | 375/122 |
| 4,652,856 | 3/1987 | Mohiuddin et al. | 340/347 |
| 4,691,329 | 9/1987 | Juri et al. | 382/56 |
| 4,698,689 | 10/1987 | Tzou | 358/433 |
| 4,797,741 | 1/1989 | Sato et al. | 382/56 |
| 4,805,030 | 2/1989 | Tanaka | 358/433 |
| 4,870,497 | 9/1989 | Chamzas et al. | 358/426 |
| 4,873,577 | 10/1989 | Chamzas | 358/426 |
| 4,903,317 | 2/1990 | Nishihara et al. | 382/56 |
| 4,922,273 | 5/1990 | Yonekawa et al. | 382/56 |
| 5,014,198 | 5/1991 | Umemura | 382/56 |

OTHER PUBLICATIONS

Mark R. Jaworski, "Imaging for Military Communications", Advanced Imaging Military Communications, May 1991, pp. 18, 21.
Connie Guglielmo, "PicturePress compresses in ratios up to 100-to-1", News MACWEEK, Nov. 6, 1990.

*Primary Examiner*—Jose L. Couso
*Attorney, Agent, or Firm*—Townsend and Townsend Khourie and Crew

[57] ABSTRACT

An enhancement to a standard lossy image compression technique wherein a single set of side information is provided to allow decompression of the compressed file. Certain portions of the image are selected (either by the user or automatically) for more compression than other portions of the image. A particular embodiment is implemented for use with the JPEG image compression technique. JPEG calls for subdividing the image into blocks, transforming the array of pixel values in each block according to a discrete cosine transform (DCT) so as to generate a plurality of coefficients, quantizing the coefficients for each block, and entropy encoding the quantized coefficients for each block. Techniques for increasing the compression ratio include subjecting each selected block to a low pass filtering operation prior to the transform, subjecting the coefficients for each selected block to a thresholding operation before the quantizing step, subjecting the coefficients for each selected block to a downward weighting operation before encoding them, or, where the entropy encoding uses Huffman codes, mapping coefficients to adjacent shorter codes.

31 Claims, 3 Drawing Sheets

Microfiche Appendix Included
(2 Microfiche, 163 Pages)

|  | NUMBER OF BITS | | | | | | |
|---|---|---|---|---|---|---|---|
|  |  | 0 | 1 | 2 | 3 | ... | 9 | 10 |
| NUMBER OF 0's | 0 | EOB | S | L | S | ... | S | L |
|  | 0 |  | S | L | S | ... | S | L |
|  | ... | ... | ... | ... | ... | ... | ... | ... |
|  | 14 | — | S | L | S | ... | S | L |
|  | 15 | ZRL | S | L | S | ... | S | L |

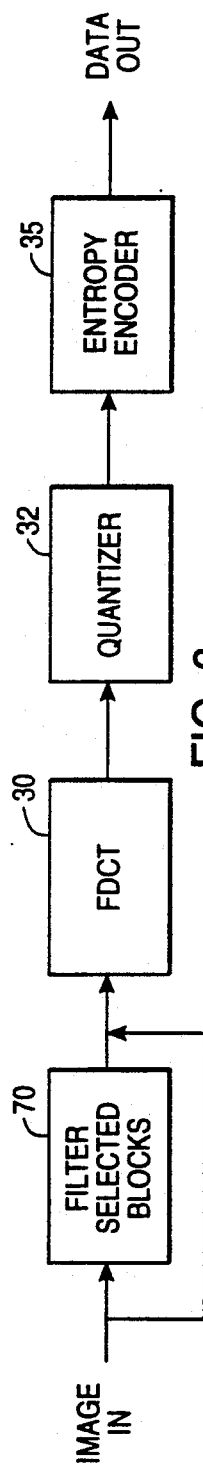
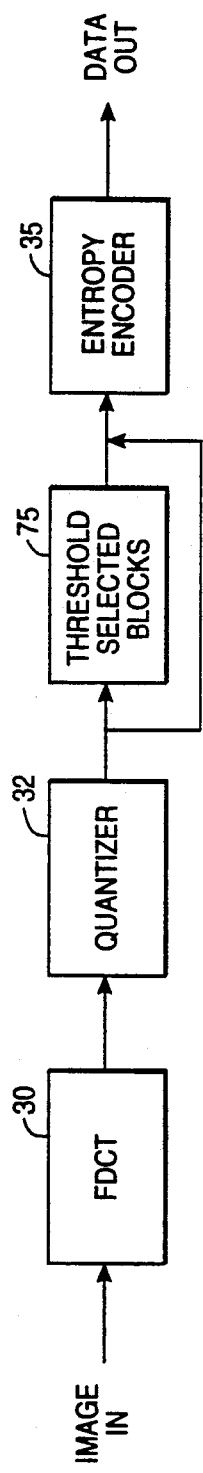
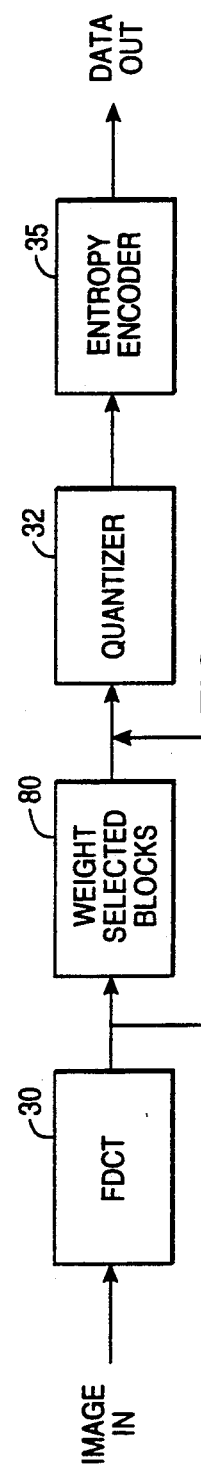
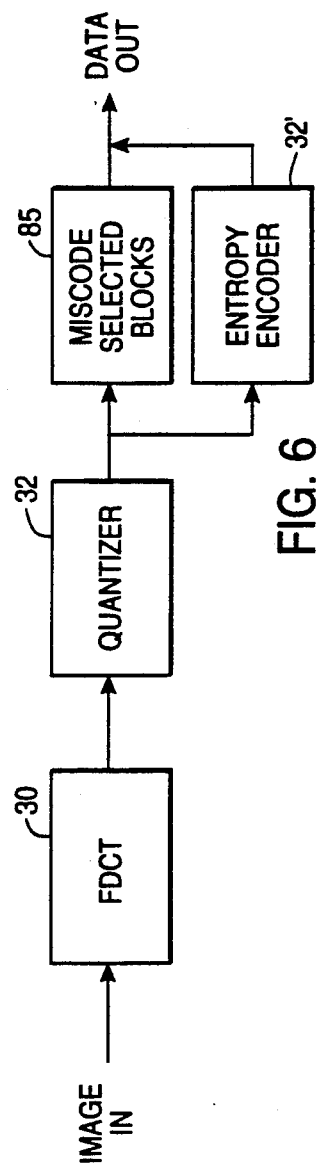

IMAGE COMPRESSION TECHNIQUE WITH REGIONALLY SELECTIVE COMPRESSION RATIO

This is a continuation of application of Ser. No. 07/664,256 filed Mar. 4, 1991, now abondoned.

MICROFICHE APPENDIX - COPYRIGHT NOTICE

A two-fiche microfiche Appendix 1 containing source code for a software implementation of the JPEG encode, enhanced according to the present invention is included with this application. A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to image compression and more specifically to a technique for differentially compressing portions of the image.

Emerging applications, such as full color (24-bit) desktop publishing, photovideotex, phototransmission, supported by 24-bit color scanners, monitors, printers, and cameras, need data reduction and standards to reach acceptable price performance levels.

One initial focus in the early 1980's, was on the use of photographic images within videotex systems. It was expected that such systems would eventually employ ISDN (64 Kbit/sec) lines for transmission and monitors as softcopy displays. The initial algorithm requirements and the evaluation procedures reflect the early focus. 720 by 576 pixels color images (CCIR 601 format) were selected as test material. Compression goals included good image quality around 1 bits/pixel and "progressive build-up", allowing an early recognition of the image at a lower quality. The image quality evaluation was tied to relatively inexpensive monitors.

In 1986 the Joint Photographic Expert Group (JPEG) was formed as a joint committee of ISO and the CCITT to develop and propose an efficient image compression standard. Soon more target applications were identified, broadening the scope of the standard. It needed to support a wide variety of pixel resolutions, color spaces, and transmission bandwidths. In addition the efficiency of implementation in both software and hardware became an important additional requirement.

Given these requirements, in a competition between twelve algorithms covering a wide spectrum of algorithms, three finalists were selected in June, 1987: block truncation approach, an interpolative spatial domain approach and a transform based method. From these three finalists, the Adaptive Discrete Cosine Transform (ADCT) was unanimously selected in early 1988 as having produced the best picture quality. Since then, a cooperative effort to refine, test and document the DCT-based method has been in progress.

This effort resulted in development of a three part structure, including the baseline system, the extended system, and independent lossless coding function. Technical agreement was reached in the October, 1989 Tokyo meeting, a draft specification was made publicly available in January, 1990, and an ISO Draft Proposed Standard (DPS) is expected for 1991.

The selected baseline algorithm is a lossy technique based on the discrete cosine transform (DCT), a uniform quantizer, and entropy encoding. The transform removes the data redundancy by concentrating most of the information in the first few transform coefficients. The quantizer controls the loss of information and the picture quality. The entropy encoding reduces the entropy of the signal. The JPEG proposed standard includes a baseline system, an extended system, and a separate lossless function. The baseline system represents the default communication mode, and each standard decoder is required to interpret data coded with the baseline system. The extended system provides additional features such as progressive build-up and arithmetic coding. These features can be used when implemented by both the encoder and the decoder.

SUMMARY OF THE INVENTION

The present invention is drawn to a flexible and effective image compression technique that provides maximum compression consistent with maintaining image quality in selected areas. The technique may be implemented for use with a standard image compression technique, and the compressed image file may be decompressed with any hardware or software that is compatible with the standard.

The invention operates in the context of a lossy image compression technique wherein a single set of side information is provided to allow decompression of the compressed file. According to the invention, certain portions of the image are selected (either by the user or automatically) for more compression than other portions of the image. The elimination of bits in regions selected for higher levels of compression is performed in a manner that has relatively minimal impact on visual quality. This selective or intelligent compression, using the bits where they are the most effective, allows the user to maximize image quality, compress to a fixed file size, or ensure an upper bound on the reconstruction error between the original and the decompressed image.

A particular embodiment of the invention is implemented for use in conjunction with the JPEG image compression technique. The JPEG proposed standard calls for subdividing the image into blocks, transforming the array of pixel values in each block according to a discrete cosine transform (DCT) so as to generate a plurality of coefficients, quantizing the coefficients for each block, and entropy encoding the quantized coefficients for each block. Within this context, one or more of a number of techniques for rejecting weak components are used to selectively reduce the number of bits in the compressed image for that block. These techniques include subjecting each selected block to a low pass filtering operation prior to the transform, subjecting the coefficients for each selected block to a thresholding operation before or after the quantizing step, subjecting the coefficients for each selected block to a downward weighting operation before encoding them, or, where the entropy encoding uses Huffman codes, mapping coefficients to adjacent shorter codes. These techniques tend to eliminate weak components or components having high spatial frequencies, and thus provide significant compression while maintaining visual quality.

A further understanding of the nature and advantages of the present invention may be realized by reference to the remaining portions of the specification and the attached drawings.

BRIEF DESCRIPTION OF THE DRAWINGS

FIG. 3 is a block diagram showing an embodiment of the invention utilizing selective filtering;

FIG. 4 is a block diagram showing an embodiment of the invention utilizing selective thresholding;

FIG. 5 is a block diagram showing an embodiment of the invention utilizing selective weighting;

FIG. 6 is a block diagram showing an embodiment of the invention utilizing selective miscoding.

BRIEF DESCRIPTION OF THE APPENDICES

Appendix 1 (microfiche-2 fiches) is a source code listing of a computer program for performing the image compression according to the present invention; and Appendix 2 (paper copy) is a specification of the proposed JPEG standard.

DESCRIPTION OF SPECIFIC EMBODIMENTS

Introduction

As a threshold matter, it is useful to distinguish image compression and data compression. Data compression assumes that every bit of information in a file is important, so every bit is retained when the file is compressed. The algorithm simply stores the description of the data in a more efficient format. Because no data is lost during compression, data compression algorithms are called lossless. As a rule, these programs are capable of achieving compression ratio limits of roughly 8:1, with an average ratio of 2:1. Image compression algorithms, on the other hand must compress files at ratios from 10:1 to 100:1 in order to effectively solve the problem of huge graphic files. To achieve these higher compression rates, image compression algorithms must be lossy—they must assume that some of the data in an image file is unnecessary (or can be eliminated without affecting the perceived image quality). Since compression involves removing some of the image data from a file, compressed files don't retain all the quality of the original image (although the difference is visually indistinguishable at compression ratios up to 10:1).

The present invention is drawn to an image compression technique wherein regions of the image may be selected for relatively greater compression relative to other regions. Although increasing the compression ratio normally lowers the image quality, the invention utilizes techniques that have relatively little visual impact on the selected regions. In many cases, there are only localized portions whose high quality (information content) must be preserved.

There are a number of ways in which a color image can be broken into components. Standard monitors use the RGB characterization where R, G, and B are the red, green and blue components. Standard television broadcasting (NTSC) uses the YUV characterization where Y is the luminance component and U and V are the chrominance components (approximately red and blue). Printers use the CMYK characterization where C, M, Y, and K are the cyan, magenta, yellow, and black components. The CCIR 601 standard describes a linear transformation between the RGB characterization and the YUV characterization, The present invention is currently implemented as an enhancement of the existing JPEG (Joint Photographic Expert Group) image compression standard. Although the invention can be implemented in the context of other image compression techniques, the majority of the discussion below will be within the specific context of the proposed JPEG standard. A complete specification of the proposed standard has been filed with this application as an Appendix 2.

JPEG Overview

Figure 1:
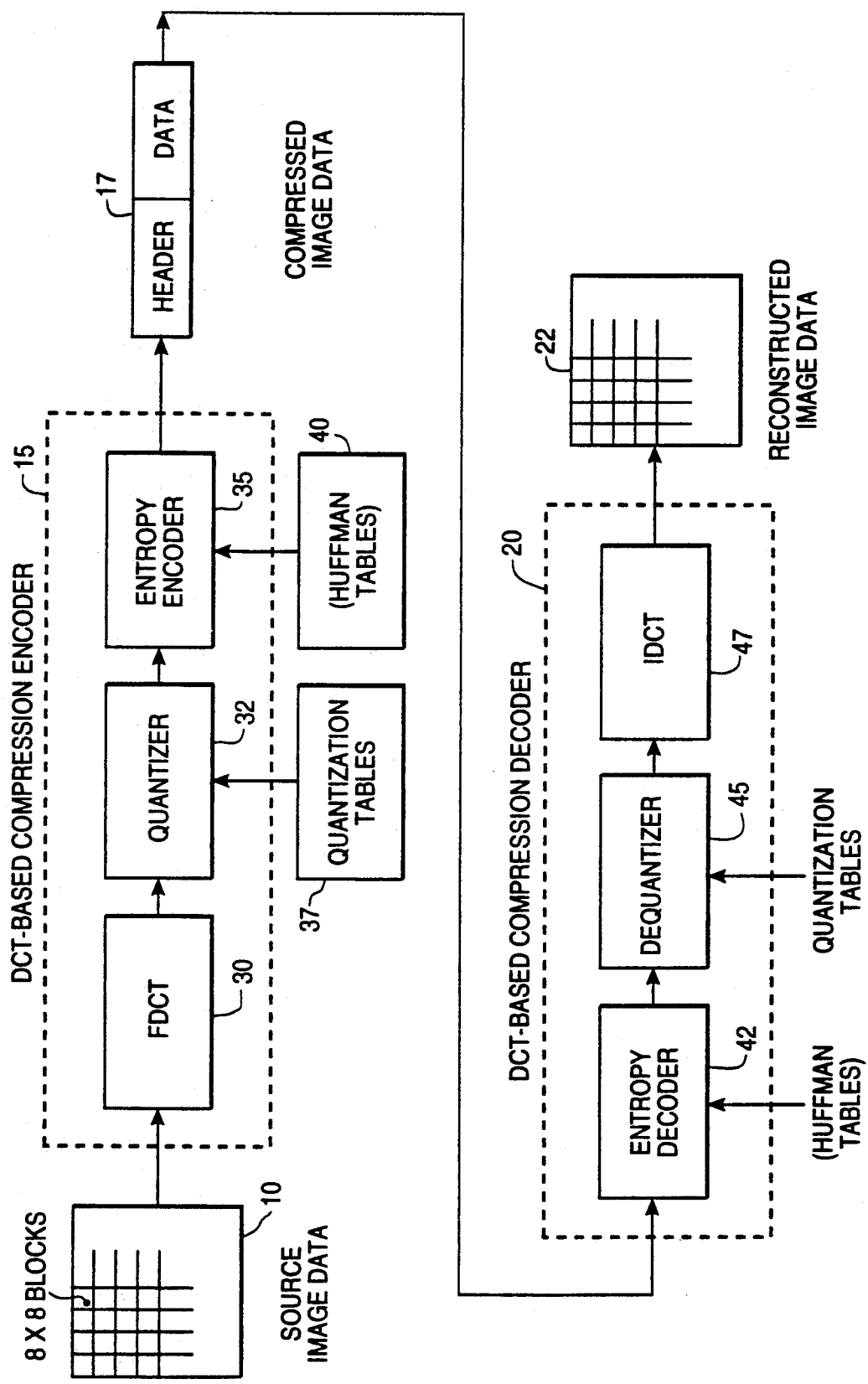
FIG. 1 is a high level block diagram showing the compression and decompression of a source image according to the JPEG standard.

FIG. 1 is a high level block diagram illustrating the basic operations in the compression, transmission, and reconstruction of a source image. The source image is represented by one or more components, each of which includes an array of multi-bit pixels. A grayscale image would include a single component while a color image would include up to four components. The operations shown apply to each component.

Data representing a source image component 10 is communicated to a compression encoder 15 to provide compressed image data 17. This data may be stored as a file for subsequent retrieval and reconstruction, or it may be transmitted on some communication medium to a remote location for immediate or subsequent reconstruction. In any event, it is contemplated that the compressed image data will be communicated to a compression decoder 20 to provide reconstructed image data 22. Compression encoder 10 uses certain data structures for the compression, and relevant portions of these must be communicated as side information for use by compression decoder in the image reconstruction. The particular compression technique under discussion contemplates a single set of side information that applies to the entire image component.

In the proposed JPEG standard, compression encoder includes a forward discrete cosine transform (FDCT) stage 30, a quantizer 32, and an entropy encoder 35. The compression decoder includes an entropy decoder 42, a dequantizer 45, and an inverse discrete cosine transform (IDCT) stage 47. In the JPEG standard, the entropy encoder is lossless and use Huffman coding in the baseline system. As will be described below, certain embodiments of the present invention introduce lossiness into the entropy encoder. The side information includes a quantization table 37 used by quantizer 32, and, where entropy encoder 15 is a Huffman encoder, a set of Huffman code tables 40.

The image component is divided into blocks of 8 pixels by 8 pixels, and each block is separately processed. Positions within an 8×8 block are denoted by a double subscript, with the first subscript referring to the row and the second subscript referring to the column. Numbering is from left to right and from top to bottom so that the upper left corner is (00), the upper right corner is (07), the lower left corner is (70), and the lower right corner is (77).

The DCT stage reduces data redundancy, producing one DC coefficient and 63 AC coefficients for each block. The DCT equations for the forward and inverse transforms are as follows:

FDCT:

-continued $$S_{vu} = (C_u C_v / 4) \sum_{x=0}^{7} \sum_{y=0}^{7} s_{yx} \cos((2x+1)u\pi/16) \cos((2y+1)v\pi/16)$$

IDCT:

$$s_{yx} = (1/4) \sum_{u=0}^{7} \sum_{v=0}^{7} C_u C_v S_{vu} \cos((2x+1)u\pi/16) \cos((2y+1)v\pi/16)$$

where $S_{vu}$ = transform coefficient at (vu) in the coefficient table;
$s_{yx}$ = pixel value at (yx) in the 8×8 block; and
$C_u, C_v = 1/\sqrt{2}$ for u,v = 0 and 1 otherwise.

As can be seen from the equation for the forward transform, $S_{00}$ is the DC component, being proportional to the sum of all the pixel values. Larger values of u and v correspond to higher spatial frequency components. Since most images tend to be characterized by lower spatial frequencies, the coefficient table tends to have the largest values toward the upper left hand corner. While nominally lossless, the DCT results in a small loss due to the inherent inability to calculate the cosine terms with perfect accuracy.

The quantizer operates to reduce the information, and hence the image quality, by a known amount. The quantization is performed by dividing each coefficient in the 8×8 coefficient table by the corresponding entry in the 8×8 quantization table, and rounding the result to the nearest integer. This reduces the magnitude of the coefficients and increases the number of zero value coefficients. The step-size of the quantizer is determined by a "visibility threshold matrix". Step size is varied according to the coefficient location and can be tuned for each color component to optimize the quantization for human perception. A lossless quantizer would have all entries equal to 1, which would mean no quantization at all.

Next the difference between the current DC coefficient and the DC coefficient of the previous block is Huffman encoded to reduce statistical redundancy. The coding model for the AC coefficients rearranges them in a zig-zag pattern as follows:

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

When the quantized AC coefficients are ordered in the zig-zag pattern described above, the string of quantized coefficient values will be characterized by runs of 0's interrupted by non-zero values. Although the individual coefficients are 10-bit numbers, the actual coefficient value will typically be a number of fewer bits with leading bits that are 0's. A unique code is assigned to each possible combination of run length and number of bits. The code is thus characterized by an integer pair, namely run/size. The run length is constrained by the number of AC coefficients (63), but in order to keep the code tables more manageable, a maximum run of 15 is permitted. Combinations with a zero size are undefined, but 0/0 is assigned a code to designate end of block (EOB) and 15/0 is assigned a code to specify a zero run length (ZRL) of 15 followed by one or more 0's.

The string of coefficient values is broken down into groups, each of which comprises a run of 0's followed by a non-zero value. The code for the particular run/size is placed in the data file, followed by the binary representation of the numerical value of the coefficient without leading 0's. Runs of more than 15 0's are handled by inserting the requisite number of ZRL codes. Decoding is accomplished by sensing a valid code, determining from it the number of data bits, and extracting the data value, which immediately follows the code.

As is typical for Huffman coding, short codes are chosen for the more probable events and longer codes are chosen for the less probable events. The codes are constrained so that no short code is the leading portion of a longer code.

The baseline system specifies two sets of typical Huffman tables, one intended for the luminance or achromatic (grayscale) component and one for the chromatic (color) components. Each set has two separate tables, one for the DC and one for the AC coefficients. Tables 1A and 1B show the code lengths (not the codes themselves) for these typical code tables. The tables are organized in rows corresponding to the number of 0's and columns corresponding to the number of bits in the values. As can be seen, the most frequent events, which are mapped to short codes, are concentrated in the upper left corner and along the top and left side edges. This reflects the fact that most of the quantized AC coefficients tend to be zero or small numbers (few bits).

The encoder of the baseline system may operate in 2 modes: a) one-pass encoding using default Huffman tables or custom, pre-calculated Huffman tables, or b) two-pass encoding, where during the first pass the encoder determines the optimal Huffman table specific for the image being encoded.

The JPEG syntax specifies that the baseline can process the 8-bit pixel data in either block interleaved or on a color component basis with no restrictions on the horizontal and vertical dimensions. In addition the baseline can handle at most four different color components and in block interleaved mode up to ten subsampled 8×8 blocks.

The extended system provides a set of additional capabilities, including progressive build-up and arithmetic coding, to meet the needs of applications requiring more than the baseline system functionality. These additional features are not required for all applications, and consequently, to minimize the cost of JPEG baseline compatibility, they are defined only in the Extended System. The extended system is a superset of the baseline system limits, by handling pixels of greater than 8 bits precision, additional data interleave schemes, and more color components.

Although the JPEG standard does not provide a priori compression ratios, there exist published quantization tables that give generally predictable levels of compression. To the extent that an image must be compressed by a defined amount (for example, to fit within a maximum file size), it is possible to perform an iterative procedure as follows. First, compress the image using an appropriate quantization table. Note the resultant size, and scale the quantization table accordingly. Compress the image with the scaled quantization table, and repeat the scaling and compression steps as necessary.

Variable Image Quality

While compressing an image approximately 10:1 typically results in little loss of perceptible visual quality, practical benefit typically requires compression ratios significantly greater than 10:1. However, such large compression ratios are likely to degrade the image, or at least portions thereof, to an unacceptable level. For example, text areas within the image might become unreadable.

The present invention addresses this dilemma by allowing different selected portions of an image to be compressed at different compression ratios so that portions that require extreme quality can be compressed at relatively low ratios while background portions and portions conveying little information can be compressed at higher ratios. The selection can be performed by the user, or in some instances can be done automatically, as for example if it is known ahead of time which portions of the image must be maintained with substantially no loss in visual quality.

Figures 2, 7:
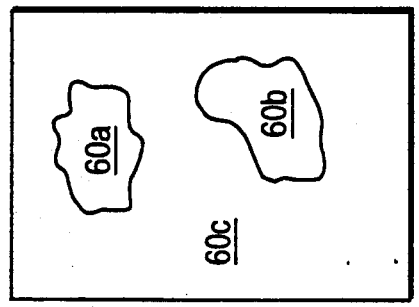
FIG. 2 shows an image subdivided into regions for differential compression.
FIG. 7 shows a specially constructed Huffman code table that allows controlled miscoding for differential compression.

FIG. 2 is a stylized view illustrating the selective compression according to the present invention and the type of file compression achievable thereby. A source image 60 is shown as having been subdivided into three regions, designated 60a, 60b, and 60c. These portions of the image are designated to receive different degrees of image compression. While the figure shows contiguous regions for the different compression ratios, it should be understood that the image can be subdivided in any way, depending on the regions of the image that are to be compressed at different ratios.

In the specific example, assume that region 60a includes fine detail, and thus requires excellent quality upon compression and decompression. In such an instance, a compression ratio of 5:1 is appropriate. Further assume that region 60b requires at most good quality, and can be compressed with a compression ratio of 20:1. Similarly, assume that region 60c contains very little detail, and can be compressed with a compression ration of 30:1. If each of regions 60a and 60b occupies ⅛ of the image area and region 60c occupies ¾ the overall or effective compression ratio is about 18:1. Typically, the regions that require the lowest level of compression will be relatively small, and therefore the overall compression ratio may be higher yet.

The procedure can be interactive with the user working at the screen (computer monitor) to select the regions and specify the relative quality levels. In a current implementation on an Apple Macintosh personal computer, the user can select regions by using a graphical interface such as the Quickdraw tools developed by Apple. The original image is on the screen, and using standard drawing tools such as the rectangular outline or the lasso tool, the user indicates with the mouse on the screen the area of interest. Depending on the action, more regions can be added to the selected region or can be deleted from the selected region. For the specific region the user determines a quality setting. All 8×8 pixel blocks of which a pixel is part of the outlined regions are marked. Those markers then are used as indicators how to process the blocks to the selected quality levels as described below.

The user is then able to see the result of the compression, both in visual terms (the compressed image is decompressed and displayed on the screen), and in numerical terms (the resultant compressed file size is shown). If either aspect of the result is unsatisfactory, the user can modify the input parameters and try again.

An automatic mode is based on the final goal (e.g., fixed file size or bounded reconstruction error). The visually important reconstruction errors are detected and the quality is adapted until the quality criteria is reached. Most of those errors will occur around edges. If a fixed file size is required the quality level is adjusted continuously such that the total amount of compression bis varies within about 10% of the goal. The various techniques described below have numerical parameters that can be varied to fine tune the compression.

While it is possible to treat each region as a separate image, and apply a suitable image compression to that image, storing or transmitting the appropriate side information with the compressed data, the present invention takes a different approach. One or a number of various techniques, to be described below, are used for selectively removing more or less information from the different regions. The compression for all regions is characterized by a single set of side information, and this single set is stored or transmitted with the file. This saves some file space, and further avoids the need to send or store information regarding the way the image was segmented for variable quality. Moreover, and perhaps most important, the proposed JPEG standard contemplates a single set of side information, and provides no mechanism for piecing together segments of an image.

The following sections describe various embodiments of the invention, each directed to a particular technique for increasing the compression ratio of selected blocks. It should be understood that the techniques are applicable individually or in combination. Moreover, different individual techniques of combinations may be appropriate for different portions of the image.

Low Pass Filtering

FIG. 3 is a high level block diagram illustrating an embodiment of the invention for reducing the quality for selected blocks. In this embodiment, selected blocks are communicated to a low-pass filtering stage 70 prior to DCT stage 30.

A simple type of filter is a moving average filter, which removes high frequency spatial components by substituting for a given pixel value the average value of some number of neighboring pixels. The larger the number of neighboring pixels that are averaged, the greater the degree of filtering. It is preferred to use a rectangular filter that averages an array of M rows and N columns. In this regime, the filtering operation is described by the following equation:

$$s'_{yx} = \sum_{i=0}^{N} \sum_{j=0}^{M} s_{(y+i)(x+j)}/MN$$

Where $s'_{yx}$ is the average value of the M×N block of pixels with the upper left corner being at (yx). Since this moving block average must be computed for each pixel, significant efficiencies can be achieved by recognizing that most of the computation has already been performed for a given average. For example, once the average for a given pixel position has been calculated, the average value for the pixel one row below it may be computed by taking the previous average value, subtracting the contribution from the previous row and adding the contribution of the new row. This may be seen as follows:

$$s'_{yx} = s'_{(y-1)x} + \sum_{m=0}^{N} s_{(y+1)(x+m)}/N = \sum_{m=0}^{N} s_{(y-1)(x+m)}/N$$

A similar extension applies to horizontally adjacent pixels.

The above equations result in averaging the pixels where the center of the rectangle is diagonally offset below and to the right of the pixel being processed. It is preferred to use an odd number of pixels for each dimension of the filter rectangle, and to center the filter at the pixel. Accordingly, if the rectangle is considered to be (2m+1)×(2n+1), the expression for $s'_{yx}$ becomes:

$$s'_{yx} = \sum_{i=-n}^{n} \sum_{j=-m}^{m} s_{(y+i)(x+j)}/((2n+1)(2m+1))$$

Since the filtering operation extends over block boundaries, it tends to smooth the transitions between regions that are being subjected to different filtering.

It is possible to apply different filters to different portions of the image. For example, four different quality levels can be established by no filter for regions of maximum quality, a 5×5 filter for regions of high quality, an 11×11 filter for regions of medium quality, and a 17×17 filter for regions of low quality. If more computing power is available, other types of linear or non-linear low pass filters can be used.

Thresholding and Downward Weighting of Coefficients

FIG. 4 is a high level block diagram illustrating another embodiment of the invention for reducing the quality for selected blocks. In this embodiment, the AC coefficients for the selected blocks are communicated to a thresholding stage 75 prior to entropy encoder 35. It is also possible to threshold before quantizing, but thresholding after is preferred since the quantized results include a visual weighting (larger divisors for higher frequencies).

A threshold level of 3 or 4 will tend to give high quality (say 16:1 compression) while a threshold level of 6 will give good quality (say 25:1 compression). In a current implementation, a single threshold is used for all the AC coefficients. A representative code sequence is as follows:

```
# define THRS 5
int S[8][8];           /* declare 8 by 8 array of integers */
void main(void)
{
    int index_v, index_u;
    /* initialize array to desired values here */
    /* test array against threshold (THRS) */
    for(index_v = 0; index_v < 8; index_v++)
    {
        for(index_u = 0; index_u < 8; index_u++)
        {
            if(index_v == 0 && index_u == 0) continue;
            if(S[index_v][index_u] < THRS)
                S[index_v][index_u] = 0;
        }
    }
}
```

The result of the thresholding operation is to set the AC coefficients having smaller absolute values to zero. It is noted that the quantizer performs a similar function in that it sets to zero those coefficients that are below their respective quantization step sizes.

An extension of this basic technique is to apply different threshold values depending on the particular AC coefficient. For example, using larger threshold values for the higher frequency AC coefficients has an effect similar to low pass filtering.

FIG. 5 is a schematic flow diagram illustrating a quality reduction technique that can be used either in conjunction with or instead of the thresholding technique. In this embodiment, the AC coefficients are communicated to a downward weighting stage 80 prior to quantizer 32. While a single weighting coefficient could be used, the effect of low pass filtering can be achieved by using larger downward weighting factors for the higher frequency AC coefficients.

Huffman Miscoding for Shorter Code Words

FIG. 6 is a high level block diagram of another embodiment of the invention for reducing the quality for selected blocks. This embodiment contemplates formulating special Huffman code tables, suitable for providing lossless encoding, and selectively miscoding certain quantized coefficient values in the blocks where greater compression is desired. To this end, the lossless entropy encoder, designated 32', has an associated lossy entropy encoder 85.

FIG. 7 shows a specially constructed Huffman code table incorporating a technique for allowing controlled miscoding for those blocks where greater compression is desired. The table is organized in rows corresponding to the number of 0's and columns corresponding to the number of bits in the values. Zero-bit numbers for non-zero values do not occur and as a result no codes are defined for no bits. However, the special case of no 0's and no bits (i.e., 0/0) is defined as the end of block (EOB), and the special case of 15/0 is used to signify the run of 15 zeroes followed by a further run of at least one 0. Thus codes are assigned for EOB and ZRL, but not for the other 0-bit values.

The general procedure for assigning Huffman codes is to assign the shortest codes to the events with the highest probabilities and the longest codes to the events with the lowest probabilities. This embodiment of the invention contemplates creating a code table where adjacent pairs of entries are characterized by short and long codes, and for extra compression in selected blocks, values that would correctly be coded with the long code are miscoded with an adjacent short code.

The procedure for generating the special Huffman code table is as follows. Each position in the code table has a certain associated probability. For a given adjacent pair of positions, which are characterized by the same run length and consecutive odd and even integer sizes, the joint probability is determined and assigned to the odd size position. Based on these enhanced probabilities, the odd size positions in the pair will get a short code. A 16-bit code is assigned to the even size position in the pair. For example, for run/size = 0/1, the sum of the probabilities for 0/1 and 0/25 is assigned to 0/1 and essentially zero probability is assigned to 0/2. Thus the code table will have the shortest codes in the odd columns and 16-bit codes in the even columns.

This is the code table that is sent as the side information, and it will provide lossless encoding of blocks of quantized coefficients. However, for those blocks where a higher compression ratio is desired, the entropy encoding is made lossy by miscoding the values that require an even number of bits. Specifically, such a value will be assigned the code for an adjacent odd size and the value for the closest value with that code. For example, consider the possible values from 1 to 15. The value 1 is a 1-bit number, the values 2-3 are 2-bit numbers, the values 4-7 are 3-bit numbers, and the values 8-15 are 4-bit numbers. For the lossy miscoding, the value 2 will get the short code for a 1-bit value and the value 1, the value 3 will get the short code for a 3-bit value and the value 4, the values 8-11 will get the short code for a 3-bit value and the value 7, while the values 12-15 will get the short code for a 5-bit value and the value 16.

Current Implementation

The thresholding embodiment of the invention is implemented in software on a digital computer. Appendix 1 (© 1990, Storm Technology, Inc. is a set of microfiches containing a source code program for an image compression encoder according to the proposed JPEG standard, as extended by incorporation of this embodiment. The program is in the "C" language, well known to those of skill in the art. The program was written to run on an Apple Macintosh personal computer, although it will be apparent to those of skill in the art that a wide variety of programming languages and hardware configurations could readily be used based on this disclosure without departing from the scope of the invention.

Conclusion

In conclusion, it can be seen that the present invention provides a simple and effective approach to extending an image compression standard to provide truly customized compression. The invention allows maximum compression consistent with preserving detail in critical areas of the image.

While the above is a complete description of various embodiments of the invention, including a software implementation of one of the embodiments, various modifications, alternatives, and equivalents may be used. For example, a software implementation as disclosed provides a relatively inexpensive solution to the problem. A faster (say by a factor of 10) solution may be provided by use of a hardware accelerator in the computer. A preferred implementation of the hardware accelerator includes one or more programmed digital signal processors (DSP's). While special purpose hardware could be designed for such an accelerator board, it is believed that a DSP based system provides greater flexibility for upgrades. Performance does not come free of cost, and a hardware implementation is likely to cost 5 times as much as the software implementation.

Therefore, the above description and illustrations should not be taken as limiting the scope of the invention which is defined by the appended claims.

TABLE 1A

Huffman Code Lengths for Luminance AC Coefficients

BITS IN VALUE

| NUMBER OF ZEROS | 0 | 1 | 2 | 3 | 4 | 5 | 6 | 7 | 8 | 9 | 10 |
|---|---|---|---|---|---|---|---|---|---|---|---|
| 0 | 4* | 2 | 2 | 3 | 4 | 5 | 7 | 8 | 10 | 16 | |
| 1 | — | 4 | 5 | 7 | 9 | 11 | 16 | | | | |
| 2 | — | 5 | 8 | 10 | 12 | 16 | | | | | |
| 3 | — | 6 | 9 | 12 | 16 | | | | | | |
| 4 | — | 6 | 10 | 16 | | | | | | | |
| 5 | — | 7 | 11 | 16 | | All codes in this | | | | | |
| 6 | — | 7 | 12 | 16 | | region are 16 bits long. | | | | | |
| 7 | — | 8 | 12 | 16 | | | | | | | |
| 8 | — | 9 | 15 | 16 | | | | | | | |
| 9 | — | 9 | 16 | | | | | | | | |
| 10 | — | 9 | 16 | | | | | | | | |
| 11 | — | 10 | 16 | | | | | | | | |
| 12 | — | 10 | 16 | | | | | | | | |
| 13 | — | 11 | 16 | | | | | | | | |
| 14 | — | 16 | | | | | | | | | |
| 15 | 11** | 16 | | | | | | | | | |

*EOB
**ZRL

TABLE 1B

Huffman Code Lengths for Chrominance AC Coefficients

BITS IN VALUE

| | 0 | 1 | 2 | 3 | 4 | 5 | 6 | 7 | 8 | 9 | 10 |
|---|---|---|---|---|---|---|---|---|---|---|---|
| 0 | 2* | 2 | 3 | 4 | 5 | 5 | 6 | 7 | 9 | 10 | 12 |
| 1 | — | 4 | 6 | 8 | 9 | 11 | 12 | 16 | | | |
| 2 | — | 5 | 8 | 10 | 12 | 15 | 16 | | | | |
| 3 | — | 5 | 8 | 10 | 12 | 16 | | | | | |
| 4 | — | 6 | 9 | 16 | | | | | | | |
| 5 | — | 6 | 10 | 16 | | All codes in this | | | | | |
| 6 | — | 7 | 11 | 16 | | region are 16 bits long. | | | | | |
| 7 | — | 7 | 11 | 16 | | | | | | | |
| 8 | — | 8 | 16 | | | | | | | | |
| 9 | — | 9 | 16 | | | | | | | | |
| 10 | — | 9 | 16 | | | | | | | | |
| 11 | — | 9 | 16 | | | | | | | | |
| 12 | — | 9 | 16 | | | | | | | | |
| 13 | — | 11 | 16 | | | | | | | | |
| 14 | — | 14 | 16 | | | | | | | | |
| 15 | 10** | 15 | 16 | | | | | | | | |

*EOB
**ZRL

What is claimed is:

1. A method of lossy image compression comprising the steps of:

accepting an image into a digital processor;

using the digital processor to subdivide a component of the image into a plurality of blocks;

using the digital processor to select a subset containing fewer than the plurality of blocks for preferentially greater compression;

using the digital processor to encode each block of the plurality according to a defined compression regime while modifying in a particular way at least a portion of the compression regime as applied to each block of the subset, the compression regime, as modified in the particular way, being applied only to the blocks of the subset;

using the digital processor to provide a single set of side information, all of which applies to every one of the encoded blocks of the plurality notwithstanding the fact that during said step of using the digital processor to encode each block of the plurality, at least a portion of the compression regime was modified as applied to each block of the subset; and using the digital processor to produce compressed image data comprising the encoded blocks and the single set of side information.

2. The method of claim 1 in which the step of using the digital processor to select a subset of the blocks for preferentially greater compression is carried out interactively with a user and incorporates accepting into the digital processor information from the user regarding which blocks are to be included in the subset.

3. The method of claim 1 in which the step of using the digital processor to select a subset of the blocks for preferentially greater compression is carried out by the digital processor without user interaction.

4. The method of claim 1 in which the single set of side information comprises a quantization table and a Huffman code table.

5. The method of claim 1 in which the encoded quantized coefficients and the single set of side information conform to the JPEG standard.

6. The method of claim 1 wherein the compressed image data is transmitted as a data stream without being stored as a data file.

7. The method of claim 1, and further comprising the steps of:
  using the digital processor to select an additional different subset containing fewer than the plurality of blocks for a different degree of preferentially greater compression; and
  within the step of using the digital processor to encode each block of the plurality, modifying in a different particular way at least a portion of the compression regime as applied to each block of the additional different subset.

8. A method for compressing an image component comprising the steps of:
  accepting the image component into a digital processor;
  using the digital processor to subdivide the image component into a plurality of blocks, each block comprising an array of pixel values;
  using the digital processor to select a subset containing fewer than the plurality of blocks for preferentially greater compression;
  using the digital processor to subject each block of the subset to a low pass filtering operation;
  using the digital processor to transform the array of pixel values in each block so as to generate a plurality of coefficients for each block;
  using the digital processor to quantize the coefficients for each block;
  using the digital processor to encode the quantized coefficients for each block;
  using the digital processor to provide a single set of side information, all of which applies to every one of the encoded blocks of the plurality; and
  using the digital processor to produce compressed image data comprising the encoded quantized coefficients for each block and the single set of side information.

9. The method of claim 8 in which the encoded quantized coefficients and the single set of side information conform to the JPEG standard.

10. A method for compressing an image component comprising the steps of:
  accepting the image component into a digital processor;
  using the digital processor to subdivide the image component into a plurality of blocks, each block comprising an array of pixel values;
  using the digital processor to select a subset containing fewer than the plurality of blocks for preferentially greater compression;
  using the digital processor to transform the array of pixel values in each block so as to generate a plurality of coefficients for each block;
  using the digital processor to quantize the coefficients for each block;
  using the digital processor to encode the quantized coefficients for each block;
  using the digital processor to subject the absolute values of the coefficients for each block of the subset to a thresholding operation between the transforming and encoding steps for that block, the thresholding operation causing each coefficient having an absolute value less than a particular value to be set to zero;
  using the digital processor to provide a single set of side information, all of which applies to every one of the encoded blocks of the plurality; and
  using the digital processor to produce compressed image data comprising encoded quantized coefficients for each block and the single set of side information.

11. The method of claim 10 wherein the thresholding operation for each block in the subset is performed after the quantizing step for that block.

12. The method of claim 10 wherein the thresholding operation for each block in the subset is characterized by different threshold levels for at least two coefficients.

13. The method of claim 10 in which the encoded quantized coefficients and the single set of side information conform to the JPEG standard.

14. A method for compressing an image component comprising the steps of:
  accepting the image component into a digital processor;
  using the digital processor to subdivide the image component into a plurality of blocks, each block comprising an array of pixel values;
  using the digital processor to select a subset containing fewer than the plurality of blocks for preferentially greater compression;
  using the digital processor to transform the array of pixel values in each block so as to generate a plurality of coefficients for each block;
  using the digital processor to quantize the coefficients for each block;
  using the digital processor to encode the quantized coefficients for each block;
  using the digital processor to subject the coefficients for each block of the subset to a downward weighting operation between the transforming and encoding steps for that block;
  using the digital processor to provide a single set of side information, all of which applies to every one of the encoded blocks of the plurality; and
  using the digital processor to produce compressed image data comprising the encoded quantized coefficients for each block and the single set of side information.

15. The method of claim 14 wherein the weighting operation for each block in the subset is performed before the quantizing step for that block.

16. The method of claim 14 wherein the weighting operation for each block in the subset is characterized by different weighting factors for at least two coefficients.

17. The method of claim 14 in which the encoded quantized coefficients and the single set of side information conform to the JPEG standard.

18. A method for compressing an image component comprising the steps of:
- accepting the image component into a digital processor;
- using the digital processor to subdivide the image component into a plurality of blocks, each block comprising an array of pixel values;
- using the digital processor to select a subset containing fewer than the plurality of blocks for preferentially greater compression;
- using the digital processor to transform the array of pixel values in each block so as to generate a plurality of coefficients for each block;
- using the digital processor to quantize the coefficients for each block;
- using the digital processor to generate a Huffman code table in which long and short codes are interspersed;
- after the step of using the digital processor to generate a Huffman code table, using the digital processor to encode the quantized coefficients for each block;
- during the step of using the digital processor to encode the quantized coefficients, for each block of the subset using the digital processor to miscode a given quantized coefficient by selecting an adjacent Huffman code rather than the Huffman code that is appropriate for the given quantized coefficient if the adjacent Huffman code is shorter than the Huffman code that is appropriate for the given quantized coefficient;
- using the digital processor to provide a single set of side information, all of which applies to every one of the encoded blocks of the plurality; and
- using the digital processor to produce compressed image data comprising the encoded quantized coefficients for each block and the single set of side information.

19. The method of claim 18, and further comprising the step, performed for each block in the subset in the event that there are more that one adjacent shorter code, of selecting the adjacent code that corresponds to the value that is closest to the value of the coefficient before the coefficient was subjected to the quantizing step.

20. The method of claim 18 in which the encoded quantized coefficients and the single set of side information conform to the JPEG standard.

21. A method for compressing an image component comprising the steps of:
- accepting the image component into a digital processor;
- using the digital processor to subdivide the image component into a plurality of blocks, each block comprising an array of pixel values;
- using the digital processor to transform the array of pixel values in each block so as to generate a plurality of coefficients for each block;
- using the digital processor to quantize the coefficients for each block;
- using the digital processor to encode the quantized coefficients for each block;
- using the digital processor to subject the absolute values of the coefficients for each block to a thresholding operation between the transforming and encoding steps for that block, the thresholding operation causing each coefficient having an absolute value less than a particular value to be set to zero;
- using the digital processor to provide a single set of side information, all of which applies to every one of the encoded blocks of the plurality; and
- using the digital processor to produce compressed image data comprising the encoded quantized coefficients for each block and the single set of side information.

22. The method of claim 21 wherein the thresholding operation for each block is performed after the quantizing step for that block.

23. The method of claim 21 wherein the thresholding operation for each block is characterized by different threshold levels for at least two coefficients.

24. A method for compressing an image component comprising the steps of:
- accepting the image component into a digital processor;
- using the digital processor to subdivide the image component into a plurality of blocks, each block comprising an array of pixel values;
- using the digital processor to transform the array of pixel values in each block so as to generate a plurality of coefficients for each block;
- using the digital processor to quantize the coefficients for each block;
- using the digital processor to encode the quantized coefficients for each block;
- using the digital processor to subject the coefficients for each block to a downward weighting operation between the transforming and encoding steps for that block;
- using the digital processor to provide a single set of side information, all of which applies to every one of the encoded blocks of the plurality; and
- using the digital processor to produce compressed image data comprising the encoded quantized coefficients for each block and the single set of side information.

25. The method of claim 24 wherein the weighting operation for each block is performed before the quantizing step for that block.

26. A method for compressing an image component comprising the steps of:
- accepting the image component into a digital processor;
- using the digital processor to subdivide the image component into a plurality of blocks, each block comprising an array of pixel values;
- using the digital processor to transform the array of pixel values in each block so as to generate a plurality of coefficients for each block;
- using the digital processor to quantize the coefficients for each block;
- using the digital processor to generate a Huffman code table in which long and short codes are interspersed;
- after the step of using the digital processor to generate a Huffman code table, using the digital processor to encode the quantized coefficients for each block;

during the step of using the digital processor to encode the quantized coefficients, for each block using the digital processor to miscode a given quantized coefficient by selecting an adjacent Huffman code rather than the Huffman code that is appropriate for the given quantized coefficient if the adjacent Huffman code is shorter than the Huffman code that is appropriate for the given quantized coefficient;

using the digital processor to provide a single set of side information, all of which applies to every one of the encoded blocks of the plurality; and using the digital processor to produce compressed image data comprising the encoded quantized coefficients for each block and the single set of side information.

27. The method of claim 26, and further comprising the step, performed for each block in the event that there are more than one adjacent shorter code, of selecting the adjacent code that corresponds to the value that is closest to the value of the coefficient before the coefficient was subjected to the quantizing step.

28. A method of lossy image compression and decompression, operating in the context of a defined compression regime and a defined decompression regime, the method comprising the steps of:

accepting a first image into a digital processor;

using the digital processor to subdivide a component of the first image into a plurality of blocks;

using the digital processor to select a subset containing fewer that the plurality of blocks for preferentially greater compression;

using the digital processor to encode each block of the plurality according to the defined compression regime while modifying in a particular way at least a portion of the compression regime as applied to each block of the subset, the compression regime, as modified in the particular way, being applied only to the blocks of the subset;

using the digital processor to provide a single set of side information, all of which applies to every one of the encoded blocks of the plurality notwithstanding the fact that during said step of using the digital processor to encode each block of the plurality, at least a portion of the compression regime was modified as applied to each block of the subset;

using the digital processor to produce a compressed image data comprising the encoded blocks and the single set of side information;

decompressing the compressed image data according to the defined image decompression regime, using the single set of side information, to produce a second image; and displaying the second image.

29. The method of claim 28 wherein the step of decompressing the compressed image data is performed using the same digital processor.

30. The method of claim 28 wherein the step of decompressing the compressed image data is performed using a different digital processor than the first-mentioned digital processor.

31. The method of claim 1 wherein the compressed image data is stored as a data file.

* * * * *